United States Patent [19]

Bidgood

[11] Patent Number: 4,917,479

[45] Date of Patent: Apr. 17, 1990

[54] ADJUSTABLE COUNTERWEIGHTED TEMPLE PIECES FOR EYEGLASSES

[76] Inventor: William T. Bidgood, Rte. 4, Box 4189, Cleveland, Ga. 30528

[21] Appl. No.: 252,116

[22] Filed: Oct. 3, 1988

[51] Int. Cl.$^4$ ............................................. G02C 5/14
[52] U.S. Cl. .................................. 351/123; 351/118; 351/122
[58] Field of Search ............... 351/123, 122, 158, 137, 351/111, 117, 118

[56] References Cited

U.S. PATENT DOCUMENTS 3,768,892  10/1973  Bidgood ............................ 351/158
4,139,281  2/1979  Luttner ............................. 351/123

Primary Examiner—P. M. Dzierzynski
Attorney, Agent, or Firm—James B. Middleton

[57] ABSTRACT

A pair of eyeglasses having a pair of lenses, a frame for the lenses, nose pieces disposed between the lenses and adapted to engage the bridge of the nose of a wearer, and a pair of temple pieces extending rearwardly over the ears of the wearer, said temple pieces consisting of either a single continuous piece with the rearward end terminating in a thin tapering hook member fitted with a movable semi-soft weighted sleeve, or with temple pieces consisting of two segments, a forward section connected by the usual hinged means to the frame holding the lenses, and a rearward section terminating in a solid hooked member made of heavy material and with a soft cushion attached underneath, said members being connected by means of a sleeve permitting of horizontal adjustment, and located at an arbitrary point between the plane of the lenses and the ears of the wearer, and the designs of the temple pieces described above resulting in lessening weight and trauma at the nose of the warer of the glasses, the elimination or reduction of soreness and feeling of weight at the ears, ease of adjustment, and a means of keeping the lenses in a proper position for maximum optical effectiveness.

3 Claims, 1 Drawing Sheet

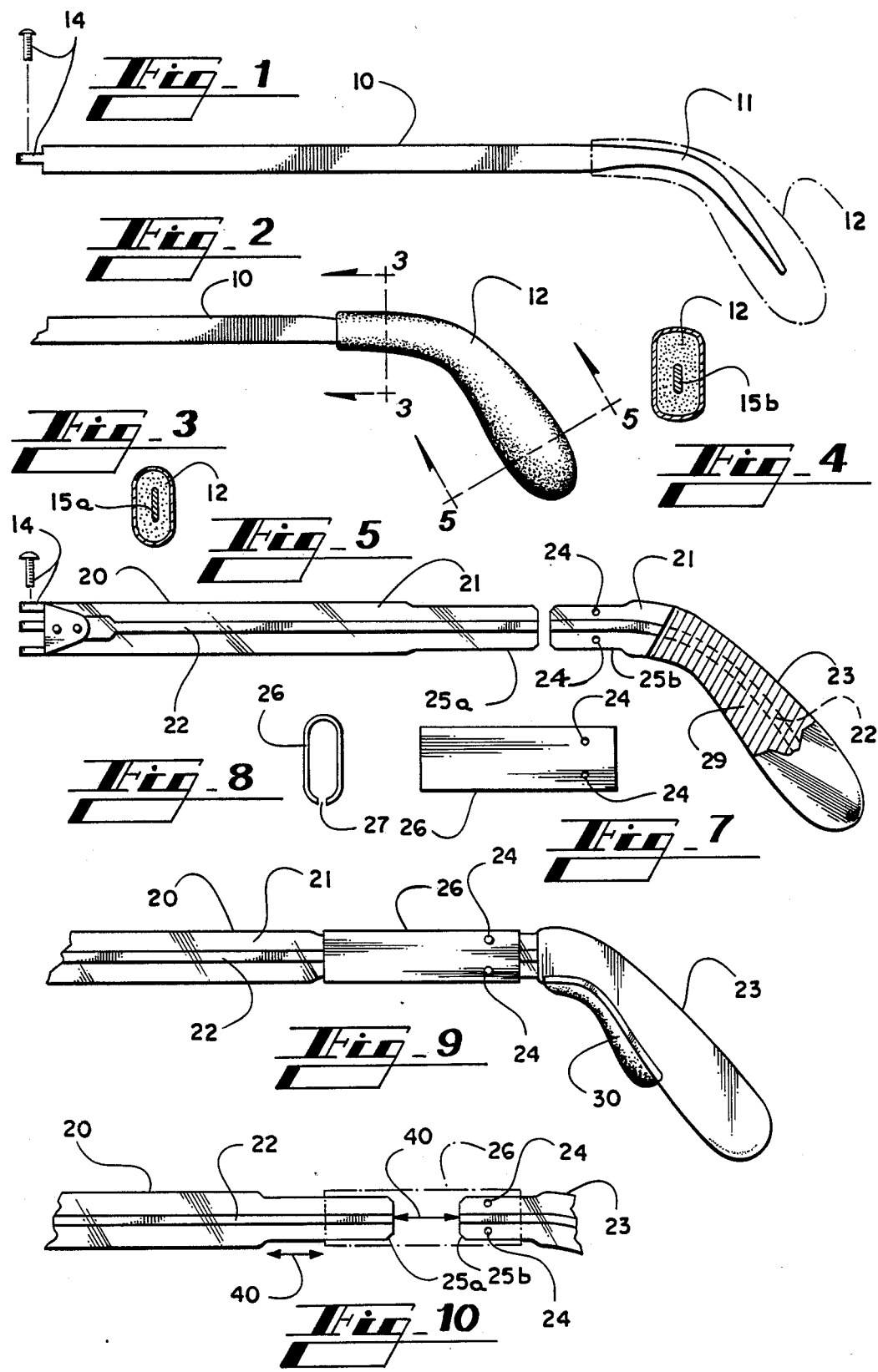

4,917,479

ADJUSTABLE COUNTERWEIGHTED TEMPLE PIECES FOR EYEGLASSES

BACKGROUND OF THE INVENTION

This invention relates to eyeglasses, hereinafter referred to as "glasses", and with said application encompassing regular eyeglasses, sunglasses, and safety glasses, and is more particularly concerned with temple pieces for glasses, and said temple pieces having counterweighed rearward extremities comprising hook members, and said counterweights being both removable and interchangeable, and designed to facilitate proper positioning of the lenses while at the same time relieving the nose and ears of the wearer of excessive weight and trauma.

Throughout the years there has been an unceasing effort to design glasses that fit comfortably on a wearer while staying in a proper position for maximum advantage of the lens design. Many improvements have been made, but there are still a number of needed improvements.

The basic arrangement of the prior art in glasses includes nosepieces between the lenses that rest on the bridge of the wearer's nose, and temple pieces to pass over and behind the ears; thus, the bridge of the nose carries the weight of the lenses, while the ears prevent forward motion of the glasses by means of hooked members passing behind them.

There have been primary problems with the usual arrangement of glasses, and these are: (1) that the weight on the bridge of the nose causes some skin trauma with resulting soreness and discomfort to the wearer, and (2) due to the incline of the bridge of the nose the lenses move downward moving the optical axes of the lenses out of position for the proper correction of vision. This sliding down has usually been corrected by taking the glasses to an optical shop to have the earhooks bent down so as to grip the ears of the wearer more tightly. This causes soreness at the ears, and the process must be repeated frequently because putting the glasses on and off tends to straighten out the earhooks in a short while.

The disadvantages discussed above were largely overcome by this inventor's patents U.S. Pat. Nos. 3,768,892 titled "Eyeglasses with Counterbalanced Temple Pieces", and U.S. Pat. No. 3,953,114 titled "Cushion Retaining Means for Eyeglasses".

In the case of the prior patent mentioned above a counterweight was either attached to the hooked member of a standard temple piece, or made integrally within the hook member. The latter patent cited provided for cushioning to be used in conjunction with the counterweights or separately from them, the cushions lessening a feeling of weight on the ears, and providing a somewhat limited means of horizontal adjustment of the frames.

SUMMARY OF THE INVENTION

The above-mentioned patented inventions are largely effective in holding glasses comfortably in place, thus maintaining the lenses in proper position for maximum effectiveness, but further improvements are now contemplated in the present invention, which include easier means of balancing the glasses, improved adjusting means, and better appearance.

In practically all glasses the point of balance is at the forward end of the temple pieces near the attaching hinges. To move the balance to a desired point nearer to the top of the ears of the wearer than to the plane of the lenses requires the addition of weight behind the ears of the wearer, with the necessary amount determined by the weight of the lenses and frame. In the case of the prior art, with the counterweight made integrally with the hook member, a considerable number of temple pieces were needed in order to obtain a proper balance of the glasses, and for the proper length of the temple pieces required for individual wearers, whereas in the present invention only one or two temple pieces will be required for proper length, and with a selection of easibly-attachable counterweights to choose from for balance, and with horizontal adjustment capability, also.

The present invention makes possible the obtaining of a proper balance of the glasses, with inherent adjusting means, by use of either of two designs.

In one design the temple pieces of the glasses terminate in thin, tapered earhooks, over which are fitted semi-soft sleeves consisting of a rubbery-type material which is filled with a heavy powdered material such as stainless steel, or other heavy, inert material. The rubbery-type material is mixed together with the heavy powdered material, is heated, and injected into a mold. The resulting semi-soft sleeve is molded with a narrow inside space which is designed to fit snugly on the earhooks, which assures a proper positioning of the sleeve, and allows for considerable horizontal adjustment of the glasses. The heavy, semi-soft sleeve serves as both a counterweight and cushioning means, and is used most advantageously with smaller, lightweight glasses such as sunglasses, women's and children's glasses, half-lens glasses, etc. These sleeves, for use on heavier glasses, would require a rather large size which would be cumbersome and unesthetic.

A second design of temple pieces, which would generally be used for heavier glasses, in a two-piece temple bar consisting of a forward section attached by the usual hinged arrangement to the frame containing the lenses, and with a separate, counterweighted piece forming an earhook, and attached to the forward section at an arbitrary point between the ears of the wearer and the plane of the lenses by means of a sleeve of thin spring steel or other suitable material, and designed to allow considerable horizontal adjustment. This design requires the use of a cushion to reduce or eliminate a feeling of weight on the ears of the wearer, the cushion being of a tapered design, and fitted to the undersides of the earhooks by means of glue, grooving, clamps, or other means.

Thus, by means of either one of the two designs described above, glasses may be easily balanced by attaching a counterweight, and be longitudinally adjusted by means inherent in the designs.

These and other objects and advantages of the details of construction will become apparent after reading the following description of the illustrative embodiment, with reference to the attached drawings wherein the reference numerals have been used to refer to like parts throughout the several figures, and wherein

BRIEF DESCRIPTION OF THE DRAWINGS

FIG. 1 is a side elevational view of a temple piece according to a disclosed embodiment of the present invention, and having a sleeve covering the earhook in phantom.

FIG. 2 is a fragmentary view showing a modified form of the disclosed embodiment of the present invention depicted in FIG. 1, and with a semi-soft, counterweighted sleeve covering the earhook.

FIG. 3 is a cross-sectional view taken substantially along the line 3—3 in FIG. 2, and is somewhat enlarged.

FIG. 4 is an enlarged cross-sectional view taken substantially along the line 5—5 in FIG. 2.

FIG. 5 is a side elevational view of the forward section of a two-piece temple bar and earhook according to a disclosed embodiment of the present invention.

FIG. 6 is the rearward section of a two-piece temple bar and hook member, and is weighted according to a disclosed embodiment of the present invention.

FIG. 7 is a side elevational view of a sleeve for connecting the two segments of a two-piece temple piece and hook member shown in FIGS. 5 and 6.

FIG. 8 is an enlarged cross-sectional view of the connecting sleeve depicted in FIG. 7.

FIG. 9 is a fragmentary view showing the sleeve in place, and joining together the temple piece and hook member as depicted in FIGS. 5, 6, and 7.

FIG. 10 is a fragmentary view showing the connecting sleeve in phantom connecting the two segments depicted in FIGS. 5 and 6, and illustrating the longitudinal adjusting means inherent in the design.

DESCRIPTION OF THE PREFERRED EMBODIMENT

Referring now more particularly to the drawing and to those embodiments here chosen by way of illustration, it will be seen that FIG. 1 shows one design of a temple piece used in conjunction with eyeglasses, eyeglasses hereinafter being called "glasses", and being construed to means eyeglasses, sunglasses, and/or safety glasses. The temple piece 10 is a substantially conventional member made of thin, narrow metal, and ending in a modified thin, tapering hook member 11 at the rearward end. The usual hinge and screw connecting means 14 is shown at the forward end of the temple piece.

The basic shape and construction of the temple piece 10 is rather conventional for sunglasses and other lightweight glasses, but the earhook 11 is thin and tapered, and is designed to receive a weighted rubbery-type sleeve 12 shown in outline in FIG. 1 which will be described more fully hereinafter.

FIG. 2 shows the rearward end or earhook 11 of the temple piece 10 shown in FIG. 1, with a tapered covering sleeve 12 enveloping the earhook 11 shown in FIG. 1. The sleeve 12 is made of a mixture of powdered stainless steel, or other heavy, inert material, and polyurethane or other rubbery-type material, and is designed to serve as a self-cushioning counterweight. The size and weight of the sleeve 12 are determined by the weight of the lenses and frame of the glasses, and is of such size and weight necessary to move the balance of the glasses nearer to the top of the ears of the wearer than to the plane of the lenses. Thus, trauma to the nose is eliminated or greatly reduced, the lenses are held in a proper position for maximum optical correction, and trauma to the ears is prevented by the cushioning effect of the earhook-covering sleeves.

FIG. 3 is an enlarged cross-sectional view of the counterweighted semi-soft sleeve 12 taken substantially along the line 3—3 in FIG. 2, depicting the heavy powdered rubbery material of the sleeve 12 with its inside cavity 15a designed to fit snugly on the earhook 11 (FIG. 1) so as to prevent unwanted movement; however, the sleeve 12 may be forcibly moved forward or back as needed for any desired longitudinal adjustment of the temple pieces.

FIG. 4 is a slightly-enlarged cross-sectional view taken substantially along the line 5—5 in FIG. 2 showing the larger rearward end of the cushiony counterweight 12 covering the tapered end of the earhook 11 (FIG. 1), with the correspondingly smaller inside space 15b which stabilizes the sleeve when it is in place on the earhook 11.

FIG. 5 shows the forward section of a two-piece design which is made to be attached to a rearward section comprising an earhook of optional weight. The construction of this forward section is rather conventional, with the usual hinge and screw 14 for connecting the temple piece to the frame for the lenses, the temple bar 20 being made of opaque plastic 21 surrounding a central metallic reinforcing rod 22, and a modified rearward end 25a designed for connecting the temple piece 20 to the hook member 23 (FIG. 6).

FIG. 6 shows the rearmost, or hook member section 23 of the two-piece design. The forward, or attaching end of this section 25b is constructed of opaque plastic 21 and reinforcing rod 22 the same as the temple piece in FIG. 5, but with a drilled hole 24 on each side of the reinforcing rod 22 for attaching securely the rearward end of a connecting sleeve 26 (FIG. 7). From a point on the hook member 23 which will be in contact with the top of the ear of the glasses wearer, and extending backwards to its extremity, the hook member 23 is composed of a solid, heavy metal 29 or other solid heavy material surrounding the reinforcing rod 22. The hook member 23 serves as a counterweight of optional size and weight so that a proper balance of the glasses may be obtained.

FIG. 7 shows a sleeve 26 made of spring steel, or other suitable material, which connects the two sections depicted in FIGS. 5 and 6. The sleeve 26 has two holes 24 provided for riveting the sleeve 26 to the forward end 25b of the hook member 23. Of course, the sleeve 26 may be optionally fastened by other means such as glueing, press-fit, etc.

FIG. 8 is an enlarged cross-sectional view of the sleeve 26 shown in FIG. 7. It can be of a split design 27 to facilitate fitting it onto the end 25a of the temple piece shown in FIG. 5, or it could be of unsplit design, and friction-fitted.

FIG. 9 is a fragmentary view showing the connecting sleeve 26 in place and connecting the temple piece 20 to the counterweighted hook member 23, and being rigidly attached to the forward end 25b of the hook member 23 by means of rivets 24. A soft cushion 30 is attached to the underside of the earhook 23 by means of glue or other means, to alleviate the feeling of weight on the ears of the wearer.

FIG. 10 is a fragmentary view which shows the outline of a connecting sleeve 26 overlapping the forward end of the hook member 25b by approximately ½ inch, and being riveted in place 24. The forward end of the sleeve 26 is shown overlapping the rearward end of the temple piece 25a by approximately ½ inch, thus leaving an adjustable space 40 of ½ inch. The sleeve 26 in this depiction is 1½ inches long but may be made of different lengths with varying limits of adjustment travel, and located at any desired point between the plane of the lenses, and forward of the ears of the wearer.

Because of the considerable longitudinal adjusting means inherent in the construction of the temple pieces, probably no more than two standard lengths of the forward section FIG. 5 would be required to fit all glasses wearers, as compared to the numerous lengths required at present. This would result in considerably less inventory cost to the purveyor of glasses, and, also the glasses wearer can easily make any necessary longitudinal adjustment needed without making the bothersome and costly trips to the optical establishment.

It will of course be understood that the embodiments of the invention herein presented are by way of illustration only, and are meant to be in no way restrictive; therefore, numerous modifications and changes may be made, and the full use of equivalents resorted to, without departing from the scope of the invention as defined by the appended claims.

What is claimed is:

1. In a temple piece for a pair of glasses, said temple piece terminating in a hook receivable over the ear of the wearer, the improvement wherein the said temple piece is substantially rigid and terminates in a thin, tapering hook member for receiving a weighted semi-solid sleeve, said weighted sleeve comprising a semi-solid sleeve-like envelope of tapered design, said envelope containing a mixture of rubbery material and heavy, inert powdered material, said weighted envelope defining a tapered narrow inside space for snugly receiving said tapering hook member, the arrangement being that the top of the ear of the glasses wearer serves as the fulcrum for the glasses, the said weighted sleeve being of sufficient weight to move the balance of the glasses to a point along the temple piece nearer to the ears of the wearer than to the opposite end of said temple piece, said weighted sleeve fitting snugly on said tapering hook member, the arrangement being such that said weighted sleeve is movable as a means of longitudinal adjustment of said temple piece by a wedging action behind the ear of the wearer, the wedging action being due to the tapered hook member received within said narrow inside space of said weighted envelope, said sleeve serving as both counterweight and cushion.

2. In a temple piece as claimed in claim 1, the further improvement wherein said temple piece comprises a forward section and a rearward section, said forward section including a hinge for attachment of said temple piece to the glasses, said rearward section including said hook member, said hook member comprising said weighted envelope, and a sleeve for connecting said forward section and said rearward section at a selected point between said hook member and the opposite end of said temple piece, and further including a tapered cushion fixed to the underside of said hook member for engaging the top of the ear of the wearer and extending downward behind the ear.

3. In a temple piece as claimed in claim 2, said sleeve for connecting said forward section and said rearward section being formed of spring steel, and including means for fixing one of said sections to said sleeve, the other of said sections being slidable within said sleeve for longitudinal adjustment of said rearward section with respect to said forward section.

* * * * *